(12) United States Patent
Pedersen (10) Patent No.: US 11,535,142 B1
(45) Date of Patent: Dec. 27, 2022

(54) LOWERABLE AND RAISABLE VEHICLE TRAILER SYSTEM, AND METHOD OF OPERATING A VEHICLE TRAILER SYSTEM

(71) Applicant: James Pedersen, Deltona, FL (US)

(72) Inventor: James Pedersen, Deltona, FL (US)

( * ) Notice: Subject to any disclaimer, the term of this patent is extended or adjusted under 35 U.S.C. 154(b) by 0 days.

(21) Appl. No.: 17/002,521

(22) Filed: Aug. 25, 2020

Related U.S. Application Data (63) Continuation-in-part of application No. 15/593,655, filed on May 12, 2017, now Pat. No. 10,752,147.

(60) Provisional application No. 62/336,193, filed on May 13, 2016.

(51) Int. Cl.
  *B60P 1/28* (2006.01)
  *B62D 53/06* (2006.01)
  *B60P 1/52* (2006.01)

(52) U.S. Cl.
  CPC .............. *B60P 1/28* (2013.01); *B60P 1/52* (2013.01); *B62D 53/062* (2013.01)

(58) Field of Classification Search
  CPC ............ B60P 1/28; B60P 1/52; B62D 53/062
  See application file for complete search history.

(56) References Cited

U.S. PATENT DOCUMENTS

| | | | | |
|---|---|---|---|---|
| 3,987,919 A | * | 10/1976 | Weeks | B60P 1/08 414/471 |
| 5,013,056 A | * | 5/1991 | Landoll | B60P 1/18 280/149.2 |
| 2017/0305399 A1 | * | 10/2017 | Posta | B60T 7/08 |

* cited by examiner

*Primary Examiner* — Saul Rodriguez
*Assistant Examiner* — Willie Berry, Jr.
(74) *Attorney, Agent, or Firm* — John Rizvi, P.A.

(57) ABSTRACT

A selectively lowerable and raisable vehicle trailer system for raising and lowering of a vehicle trailer to expedite loading and unloading of cargo includes a rear wheel assembly. An elongated trailer is pivotally supported by the rear wheel assembly. The trailer is positional between a horizontal transport orientation and a sloped or angled loading/unloading orientation on the rear wheel assembly. The rear wheel assembly is selectively adjustable in position along the trailer between a rear transport position and a forward loading/unloading position, rearward and forward of the trailer center of gravity, respectively. A wheel assembly adjustment mechanism engages the rear wheel assembly. The wheel assembly adjustment mechanism operably engages the rear wheel assembly to facilitate selective positioning of the rear wheel assembly between the transport position and the loading/unloading position. A method of loading and unloading cargo onto and from a vehicle trailer is also disclosed.

16 Claims, 8 Drawing Sheets

LOWERABLE AND RAISABLE VEHICLE TRAILER SYSTEM, AND METHOD OF OPERATING A VEHICLE TRAILER SYSTEM

CROSS-REFERENCE TO RELATED APPLICATIONS

This application is a Continuation-in-Part (CIP) of U.S. patent application Ser. No. 15/593,655, filed on May 12, 2017, which in turn claims the benefit of U.S. Provisional Patent Application No. 62/336,193, filed on May 13, 2016, which are incorporated by reference herein in their entirety.

FIELD OF THE INVENTION

The present invention relates generally to vehicle trailer systems, and more particularly, to a selectively lowerable and raisable vehicle trailer system and a method of operating a vehicle trailer system, which facilitate selective raising and lowering of a vehicle trailer to expedite loading and unloading of cargo.

BACKGROUND OF THE INVENTION

Semi-trailer trucks are frequently used to transport cargo of various kinds. A typical semi-trailer truck includes a tractor unit and an elongated, wheeled trailer which is articulately coupled to the tractor unit. The trailer typically includes a pair of rear doors which are opened to facilitate loading and unloading of cargo into and from, respectively, the interior of the trailer.

Cargo is typically loaded into the trailer of a semi-trailer truck at a manufacturing facility or a warehouse or other distribution facility and then transported to an unloading destination which may have one or more loading docks. Loading and unloading of heavy and/or large cargo is often particularly problematic when conventional loading and unloading methods and techniques are used. Loading of cargo into the trailer may be facilitated using a temporary ramp, one end of which is typically supported by the rear end of the trailer and the other end of which typically rests on the ground. The cargo must then be pushed, pulled or rolled up the ramp into the trailer. In some applications, an elevated platform or lifting equipment such as a forklift may be used to load cargo into the trailer.

In the event of lack of space or an insufficient number of loading docks at the unloading destination, truckers may be required to wait in line for unloading of the cargo, potentially retarding the progress of business. Moreover, delivery of cargo to its destination (e.g., a retail store or a fast food establishment) may require that the truck be parked in the parking lot of the establishment, a flimsy ramp be extended from the rear of the trailer, and a dolly used to transport the cargo from the trailer, down the ramp and into the establishment. In some applications, a forklift may be used to unload the cargo from the trailer. In other applications, the cargo may be placed on a heavy rack which is rolled off the trailer using a lift gate. However, these techniques are attended by dangers such as the risk of the unloading personnel inadvertently falling off the trailer, ramp or lifting equipment, or dropping and breaking the cargo. Moreover, the ramp may have a tendency to slip off of the trailer. The ramp may be sloped at a steep angle, necessitating that the loading and unloading personnel overcome the pull of gravity to transport the cargo up or down the ramp. Under circumstances in which the cargo is to be loaded or unloaded at a residence or remote location, for example, forklifts or other lifting equipment may not be available for the purpose.

Accordingly, there is an established need for an improved vehicle trailer system that solves at least one of the aforementioned problems and facilitates safe and expedited loading and/or unloading of the cargo, particularly in small spaces.

SUMMARY OF THE INVENTION

The present invention is directed to a selectively lowerable and raisable vehicle trailer system, and to a method of operating the vehicle trailer system, which facilitate selective raising and lowering of a vehicle trailer to expedite loading and unloading of cargo. The vehicle trailer system may include a rear wheel assembly which is selectively adjustable in position along the length of the trailer between a rear, transport position and a forward, loading and unloading position. The center of gravity of the trailer typically lies between the transport position and the loading and unloading position. For transport of the cargo, the rear wheel assembly may be adjusted to the transport position on the trailer. In the loading and unloading of cargo into and from, respectively, the trailer, the rear wheel assembly may be adjusted from the transport position to the loading and unloading position on the trailer. Accordingly, the rear wheel assembly forwardly traverses the trailer until the rear wheel assembly typically advances past the center of gravity of the trailer. The trailer is pivoted rearwardly from a horizontal transport orientation to a sloped or angled loading/unloading orientation in which the rear end of the trailer rests on the ground, enabling personnel to load cargo into the trailer or unload the cargo from the trailer without having to lift the cargo or use a ramp for the purpose.

In a first implementation of the invention, a vehicle trailer system comprises at least one track rail configured to mount to a trailer in a front-to-back, longitudinal direction along the trailer. The vehicle trailer system further includes a rear wheel assembly comprising a bracket, a frame, at least one wheel, and a locking brake. The bracket is configured for adjustment in position along the at least one track rail for front-to-back, longitudinal displacement of the rear wheel assembly along the at least one track rail. The frame is pivotably mounted on the bracket. The at least one wheel is rotatably carried by the frame. The locking brake is operable to selectively prevent or allow rotation of the at least one wheel independently of a main air brake of a tractor unit attached to the trailer. The trailer system is configured to selectively and reversibly adopt a transport configuration, and a loading and unloading configuration. In the transport configuration, the rear wheel assembly is longitudinally adjusted to a first position along the at least one track rail while the main air brake of the tractor unit is engaged and the locking brake of the rear wheel assembly is disengaged, the first position located rearward of a center of gravity of the trailer, and the trailer is pivoted frontward relative to the rear wheel assembly and is arranged in a horizontal transport orientation. In the loading and unloading configuration, the rear wheel assembly is longitudinally adjusted to a second position along the at least one track rail while the main air brake of the tractor unit is engaged and the locking brake of the rear wheel assembly is disengaged while the at least one wheel of the rear wheel assembly are on a ground surface. The second position located frontward of the center of gravity of the trailer. In the loading and loading configuration, the trailer is pivoted rearward relative to the rear wheel assembly and is arranged in a rearward sloped orientation.

In a second aspect, the vehicle trailer system may further include a collapsible support mountable to the trailer rearward of the at least one wheel in the first position of the rear wheel assembly. The collapsible support may be configured to rest on the ground surface and dampen downward pivoting of the trailer as the trailer system switches from the transport configuration to the loading and unloading configuration.

In another aspect, the collapsible support may be deployable to an extended configuration in which the collapsible support rests on the ground surface and supports at least part of a weight of the trailer as the rear wheel assembly longitudinally surpasses the center of gravity and until the rear wheel assembly longitudinally displaces to the second position.

In another aspect, in the transport configuration of the rear wheel assembly, the collapsible support may be collapsed and may not contact the ground surface.

In another aspect, in the loading and unloading configuration of the rear wheel assembly, the collapsible support may be collapsed and may rest on the ground surface to support part of a weight of the trailer.

In yet another aspect, the collapsible support may include at least one roller configured to rest and roll on the ground surface.

In another aspect, the vehicle trailer system may further include a rear lift pivotably mountable to the rear end of the trailer and operable to selectively align with a floor of the trailer for loading and unloading of cargo to and from the trailer.

In another aspect, in the loading and unloading configuration of the trailer system, the rear lift may be aligned with the floor of the trailer.

In another aspect, in the loading and unloading configuration of the trailer system, the rear lift may touch the ground surface.

In yet another aspect, the at least one wheel of the rear wheel assembly may include at least one pair of tandem rear wheels rotatably carried by the frame.

In another aspect, the at least one track rail may be configured to mount to a bottom wall of the trailer.

In another aspect, in the transport configuration, the at least one wheel of the rear wheel assembly may be on a ground surface and may provide rolling mobility to the trailer.

In another aspect, the vehicle trailer system may further include a wheel assembly adjustment mechanism operably engageable with the rear wheel assembly to facilitate selective positioning of the rear wheel assembly relative to the at least one track rail.

In yet another aspect, the wheel assembly adjustment mechanism may include a winch.

In another aspect, the winch may be mountable to a bottom wall of the trailer.

In another aspect, the vehicle trailer system may further include at least one winch cable engageable with the rear wheel assembly and the winch. The at least one winch cable may be operable by the winch to displace the rear wheel assembly along the at least one track rail.

In another aspect, the at least one winch cable may be engageable with the frame of the rear wheel assembly.

In another implementation of the invention, a method of loading and unloading cargo to and from a vehicle trailer, comprises obtaining a vehicle trailer and a tractor unit attached to the trailer, and obtaining a vehicle trailer system. The vehicle trailer system comprises at least one track rail mounted to the trailer in a front-to-back, longitudinal direction along the trailer. The vehicle trailer system further includes a rear wheel assembly comprising a bracket, a frame, at least one wheel, and a locking brake. The bracket is configured for adjustment in position along the at least one track rail for front-to-back, longitudinal displacement of the rear wheel assembly along the at least one track rail. The frame is pivotably mounted on the bracket. In turn, the at least one wheel is rotatably carried by the frame. The locking brake is operable to selectively prevent or allow rotation of the at least one wheel independently of a main air brake of the tractor unit. The method further comprises adjusting the longitudinal position of the rear wheel assembly from a transport configuration to a loading and unloading configuration. In the transport configuration, the rear wheel assembly is longitudinally adjusted to a first position along the at least one track rail while the main air brake of the tractor unit is engaged and the locking brake of the rear wheel assembly is disengaged, the first position located rearward of a center of gravity of the trailer; further, the trailer is pivoted frontward relative to the rear wheel assembly and is arranged in a horizontal transport orientation. In the loading and unloading configuration, the rear wheel assembly is longitudinally adjusted to a second position along the at least one track rail while the main air brake of the tractor unit is engaged and the locking brake of the rear wheel assembly is disengaged while the at least one wheel of the rear wheel assembly are on a ground surface, the second position located frontward of the center of gravity of the trailer; further, the trailer is pivoted rearward relative to the rear wheel assembly and is arranged in a rearward sloped orientation.

In a second aspect, the method can further include the steps of providing a collapsible support, mounting the collapsible support to the trailer rearward of the at least one wheel in the first position of the rear wheel assembly, extending the collapsible support to rest on the ground surface, and supporting the trailer on the collapsible support as the trailer pivots downward as the rear wheel assembly is adjusted from the transport configuration to the loading and unloading configuration.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a selectively lowerable and raisable vehicle trailer system and to a method of operating a vehicle trailer system. The system and method facilitate selective raising and lowering of a vehicle trailer to expedite loading and unloading of cargo in a manner which is safe for the cargo, the vehicle, the trailer system and the operator. The system and method of the present invention can be implemented in a wide variety of vehicles and trailers; for instance and without limitation, the system and method of the present invention can be implemented in a dry van, a refrigerated trailer, a drop deck van, a drop deck flat bed, a flat bed, and a utility trailer.

Figure 5:
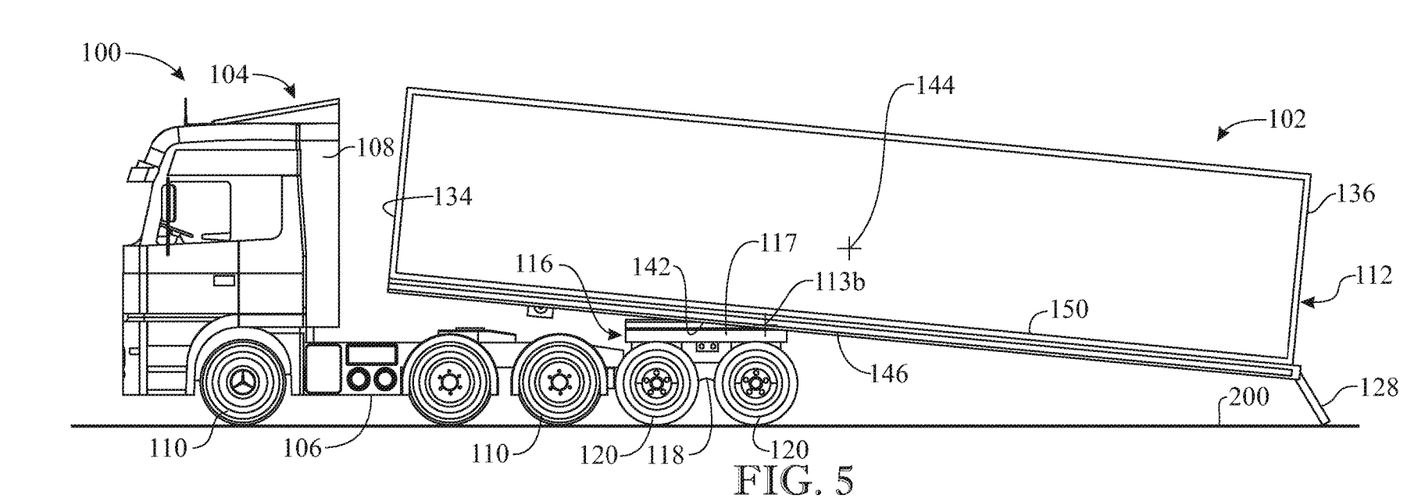
FIG. 5 presents a side elevation view of the vehicle trailer system of FIG. 1, with the rear wheel assembly at the loading/unloading position, the trailer deployed to the sloped or angled loading/unloading orientation and the rear lift in transit between the stowed position and the extended position.
Figure 6:
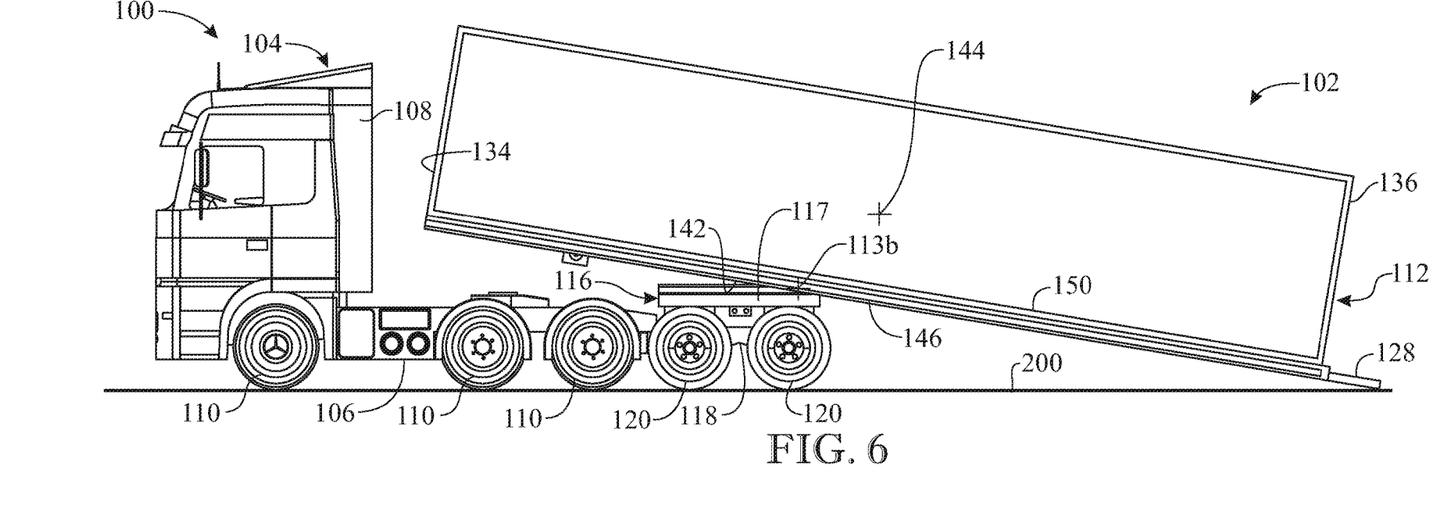
FIG. 6 presents a side elevation view of the vehicle trailer system of FIG. 1, with the rear wheel assembly at the loading/unloading position, the trailer deployed in the sloped or angled loading/unloading orientation and the rear lift deployed in the extended position for loading and unloading of cargo to and from the trailer.
Figure 7:
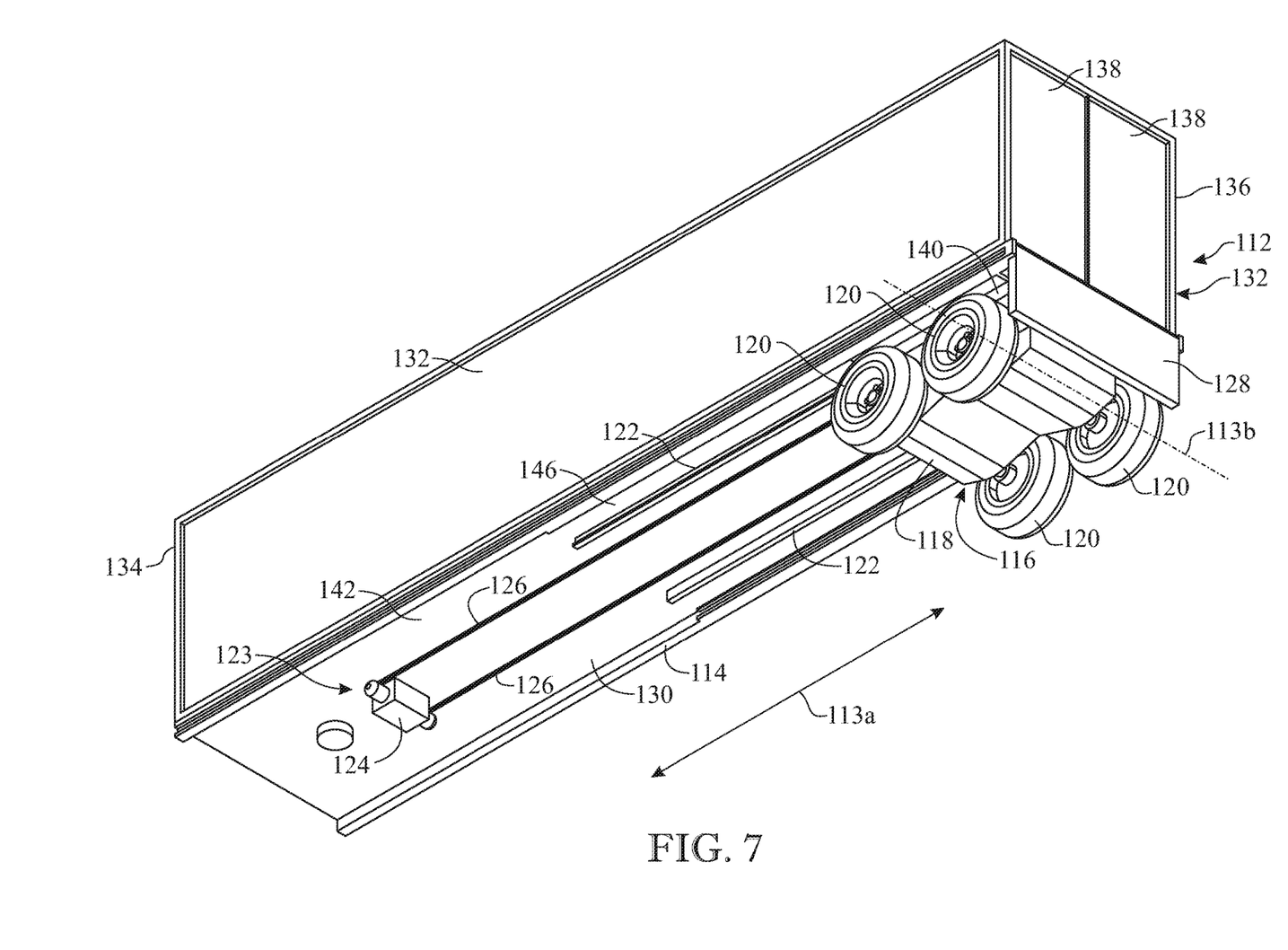
FIG. 7 presents a bottom rear perspective view of the vehicle trailer system of FIG. 1, with the rear wheel assembly at the transport position.

Referring initially to FIGS. 1-8, a lowerable and raisable vehicle trailer system 100 is illustrated in accordance with an exemplary embodiment of the present invention. By way of example, the vehicle trailer system 100 is shown implemented on an exemplary semi-trailer truck 102. As mentioned heretofore, in other embodiments, the vehicle trailer system 100 may be implemented on a flatbed trailer truck or other type of truck known by those skilled in the art. Unless otherwise noted, the semi-trailer truck 102 may have a conventional design known by those skilled in the art. For example, the semi-trailer truck 102 depicted herein includes a tractor unit 104 having a tractor unit frame 106. The tractor unit 104 further includes a cab 108 with cab wheels 110 which can be attached to, carried by or mounted on the tractor unit frame 106. A trailer 112 may be detachably coupled to the cab 108 for towing. As illustrated in FIG. 7, the trailer 112 may include a trailer frame 114. A bottom trailer wall 130 and a pair of side trailer walls 132 can be provided on the trailer frame 114. The trailer 112 can also include a top wall or roof 133 extending between the side trailer walls 132. The trailer 112 may have a front trailer end 134 proximate the tractor unit 104 and a rear trailer end 136. A pair of trailer doors 138 may be provided at the rear trailer end 136 to allow or prevent access to an interior of the trailer 112. The tractor unit 104 may include a main air brake (not illustrated) which can be selectively deployed to prevent inadvertent movement of the semi-trailer truck 102 in a parked position, as is known by those skilled in the art.

Figure 1:
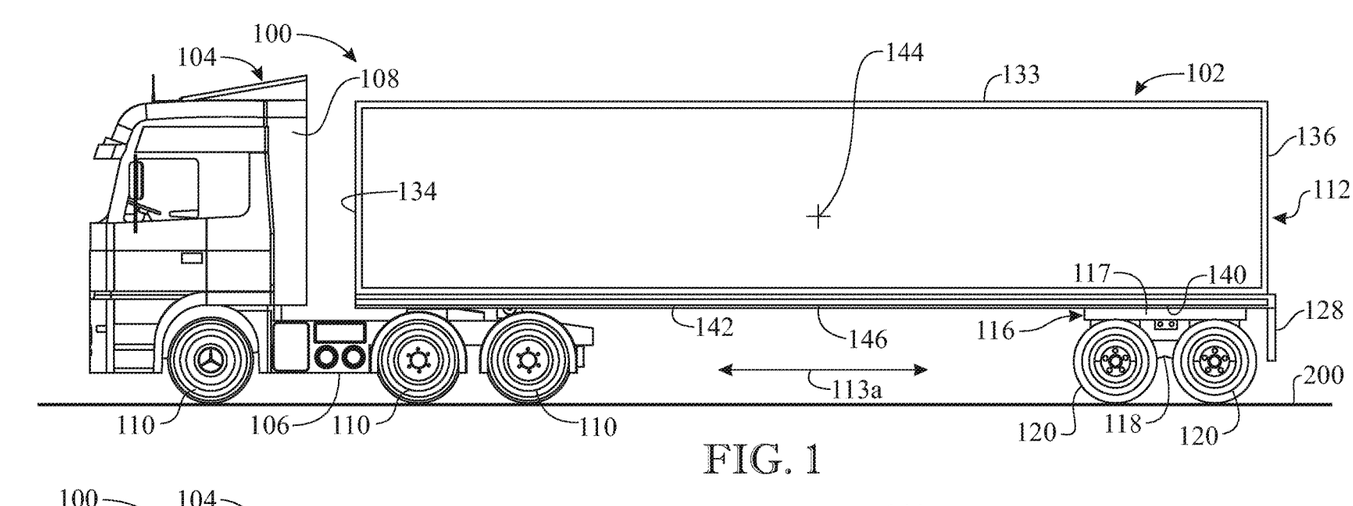
FIG. 1 presents a side elevation view of a vehicle trailer system in accordance with a first illustrative embodiment of the present invention, with the rear wheel assembly in a rear, transport position and the trailer deployed in a horizontal transport orientation.

As shown for instance in FIGS. 1 and 6, a rear wheel assembly 116 is mounted on an underside of the trailer 112. In some embodiments, the rear wheel assembly 116 may include a frame 118. At least one pair of rear wheels 120 may be mounted on the frame 118. In some embodiments, the rear wheels 120 may include two pairs of tandem wheels, as illustrated.

Figure 8:
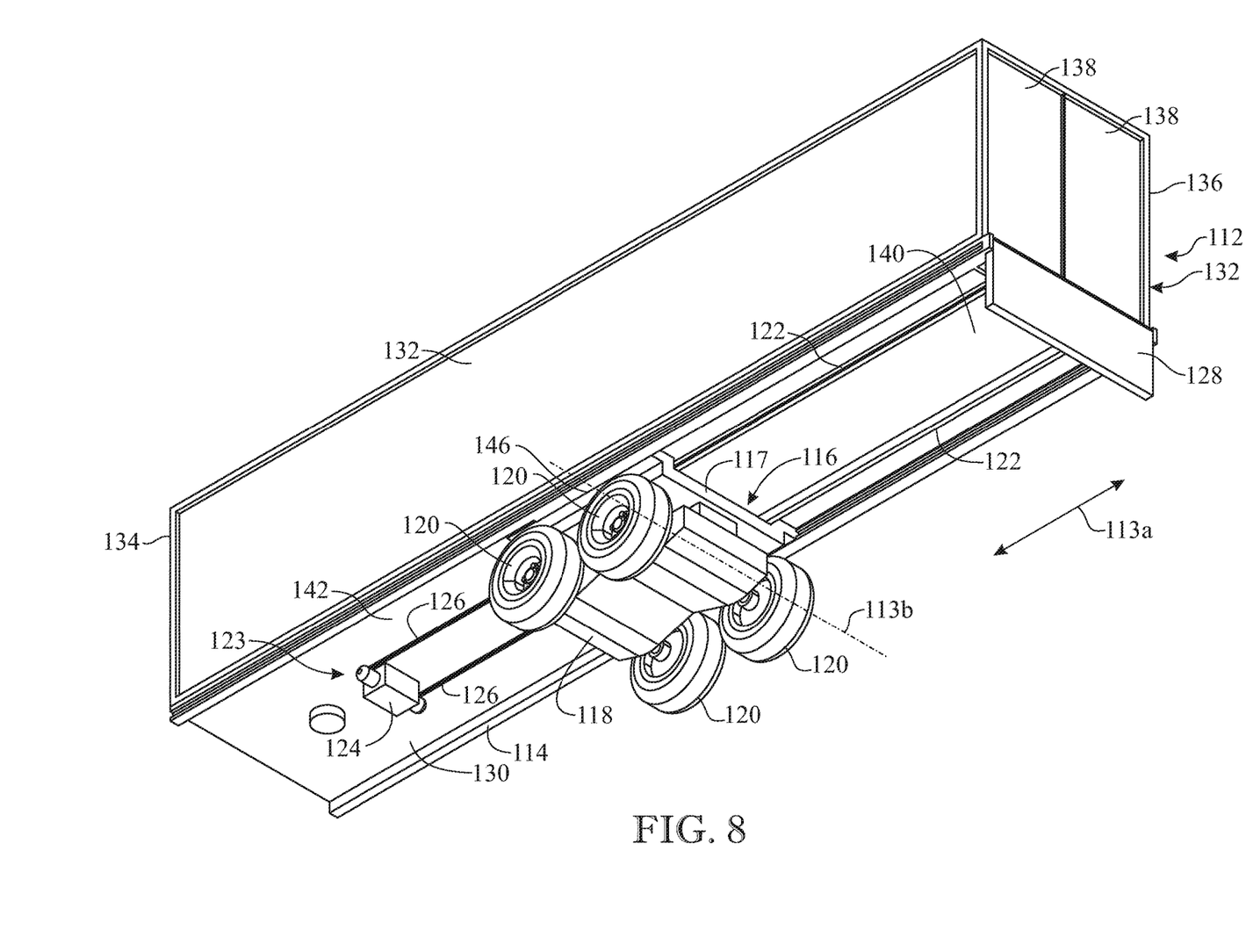
FIG. 8 presents a bottom rear perspective view of the vehicle trailer system of FIG. 1, with the rear wheel assembly at the trailer center of gravity as it transitions from the transport position to the loading/unloading position.

The rear wheel assembly 116 is slidable relative to the trailer 112 in a front-to-back, longitudinal direction 113a, and is pivotable relative to the trailer 112 about a side-to-side, transverse rotation axis 113b which is perpendicular to the longitudinal direction 113a. The position of the rear wheel assembly 116 along the front-to-back, longitudinal direction 113a is adjustable responsively to user operation of the vehicle trailer system 100, as will be described in greater detail hereinafter. As illustrated in FIGS. 7 and 8, in some embodiments, at least one elongated track rail 122 may be provided on the bottom trailer wall 130 of the trailer 112. In some embodiments, a pair of elongated, parallel, spaced-apart track rails 122 may be provided on the bottom trailer wall 130, as illustrated. The track rails 122 may be oriented generally parallel to the front-to-back, longitudinal direction 113a. As illustrated in FIG. 8, the frame 118 may be mounted on an bracket 117. The bracket 117 may engage the track rails 122 in longitudinal, front-to-back sliding relation thereto for selective positioning of the rear wheel assembly 116 from a rear, transport position 140 (FIG. 1) to a forward, loading/unloading position 142 (FIG. 4), and along intermediate positions (not numbered) arranged between the transport position 140 and the loading/unloading position 142. The trailer center of gravity 144 has been illustrated for purposes that will be described in detail hereinafter. The rear wheel assembly 116 is pivotable relative to the trailer 112, for instance by having the bracket 117 pivotably coupled to the trailer 112 (as shown in the drawings) or by having the frame 118 pivotably coupled to the bracket 117 (not shown). A locking system such as but not limited to, a transverse bolt (not illustrated) may operably engage the rear wheel assembly 116 to selectively prevent inadvertent travel of the rear wheel assembly 116 on the track rails 122 during transport, loading and unloading of the cargo.

As further illustrated in FIGS. 7 and 8, in some embodiments, a wheel assembly adjustment mechanism 123 may operably engage the rear wheel assembly 116 to cause the rear wheel assembly 116 to move between the transport position 140 and the loading/unloading position 142. In some embodiments, the wheel assembly adjustment mechanism 123 may include a winch 124 which may be mounted on the bottom trailer wall 130. The winch 124 may operably engage at least one, and more preferably, a pair of winch cables 126 for symmetrical distribution of forces to the rear wheel assembly 116. The winch cables 126 may be attached to the frame 118 of the rear wheel assembly 116 according to the knowledge of those skilled in the art. Accordingly, responsive to selective operation of the winch 124, the winch cables 126 may deploy the rear wheel assembly 116 on the track rails 122 between the transport position 140 and the loading/unloading position 142 for purposes which will be hereinafter described. The winch 124 may be operated manually, pneumatically, electrically, hydraulically, or using any other applicable mechanism responsive to user-operated controls. In other embodiments, the rear wheel assembly 116 may be configured for manual movement between the transport position 140 and the loading/unloading position 142.

A ramp, panel or other rear lift 128 may be pivotally, slidably or otherwise mounted on the trailer frame 114 at the rear trailer end 136 of the trailer 112. A ramp actuating mechanism (not illustrated), such as a hydraulic, electric or pneumatic piston, for example and without limitation, may operably engage the rear lift 128, according to the knowledge of those skilled in the art, to facilitate selective deployment of the rear lift 128 between a stowed position illustrated in FIGS. 1-4 in which the rear lift 128 is not aligned with a floor 150 of the trailer 112, and an extended position illustrated in FIG. 6 in which the rear lift 128 is substantially aligned with a floor 150 inside of the trailer 112 to facilitate loading and unloading of cargo into and from the trailer 112.

The illustrations of FIGS. 1-6 show a sequence of operation of the vehicle trailer system 100, in a typical cargo loading/unloading application of the invention. In this typical application of the vehicle trailer system 100, the trailer 112 is deployed from an initial, horizontal transport position illustrated in FIG. 1 to an angled or sloped loading/unloading position illustrated in FIG. 6 to facilitate loading of cargo (not illustrated) into the trailer 112 or unloading of cargo from the trailer 112.

In the initial position of FIG. 1, the trailer 112 is arranged generally horizontally and the rear wheel assembly 116 is located at the rear, transport position 140. In addition, the rear lift 128 is folded downward and is in the air, i.e. at a distance from the ground 200. As shown, the center of gravity 144 of the trailer 112 is located so that a horizontal projection 146 of the center of gravity 144 is arranged between the rear, transport position 140 and the front, loading/unloading position 142. In other words, the center of gravity 144 is located longitudinally between the transport position 140 and the loading/unloading position 142. The exact longitudinal position of the center of gravity 144 (i.e. the position of the horizontal projection 146) and the height of the center of gravity 144 may vary, for instance depending on whether the trailer 112 is unloaded or loaded. When loading the trailer 112, the load (not shown) can be positioned in such a way that the center of gravity 144 of the trailer 112 and load continues to be arranged so that its horizontal projection 146 is arranged between the transport position 140 and the loading/unloading position 142.

Figure 2:
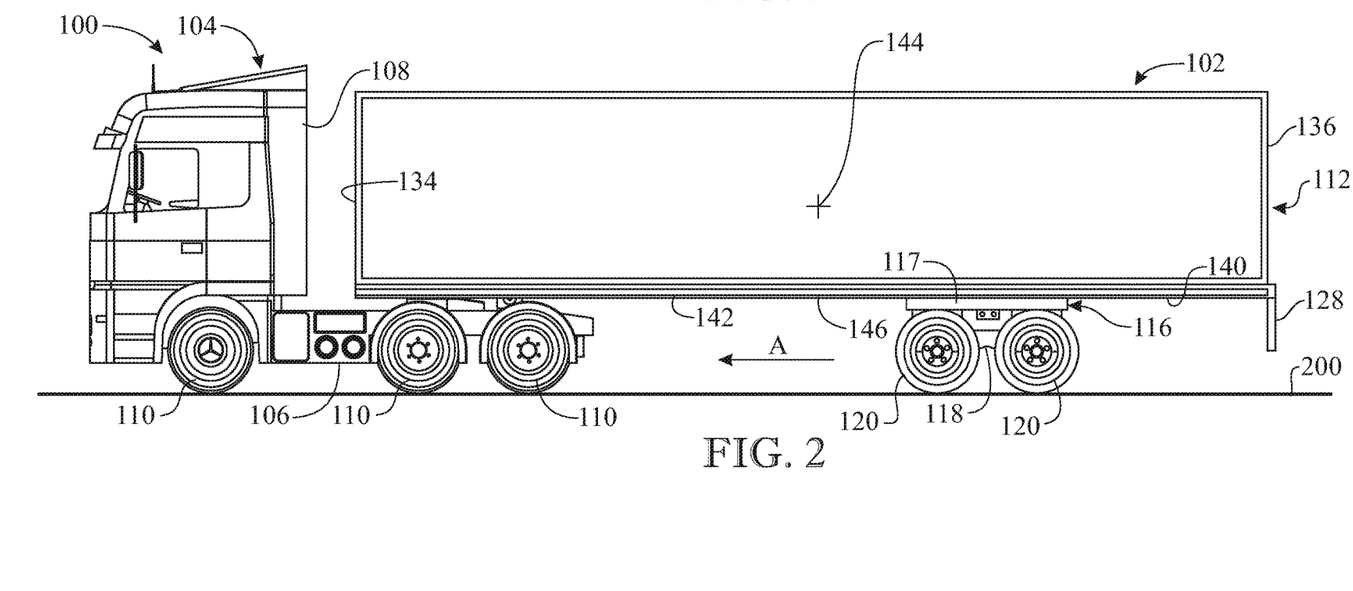
FIG. 2 presents a side elevation view of the vehicle trailer system of FIG. 1, with the rear wheel assembly in transit from the transport position to a forward loading/unloading position.
Figure 3:
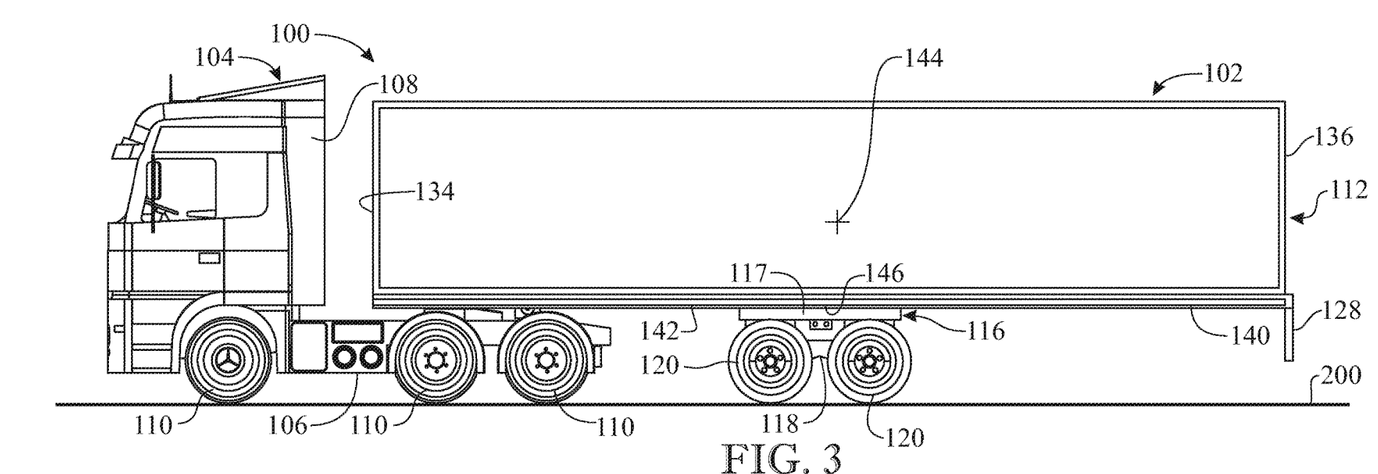
FIG. 3 presents a side elevation view of the vehicle trailer system of FIG. 1, with the rear wheel assembly at the trailer center of gravity as it transitions from the transport position to the loading/unloading position.

Starting from the initial position of FIG. 1, the main air brake (not illustrated) on the tractor unit 104 of the semi-trailer truck 102 may be activated to immobilize the semi-trailer truck 102. The semi-trailer truck 102 may then be operated, for instance and without limitation, to accumulate air pressure for a pneumatic system powering the winch 124. The locking system (not illustrated) on the rear wheel assembly 116 may then be released to facilitate travel of the rear wheel assembly 116 along the track rails 122. Next, the winch 124 of the wheel assembly adjustment mechanism 123 may be operated to start advancing the rear wheel assembly 116 on the track rails 122 from the rear, transport position 140 forward, as shown in FIG. 2 and indicated by arrow A. Continued operation of the winch 124 causes the rear wheel assembly 116 to eventually reach the horizontal projection 146 of the center of gravity 144 of the trailer 112 as illustrated in FIG. 3. From his point, continued operation of the winch 124 causes the rear wheel assembly 116 to overcome the horizontal projection 146 of the center of gravity 144, and the trailer 112 to pivot downward while the rear wheel assembly 116 continues moving forward. Eventually, the downward pivoting of the trailer 112 causes the rear lift 128 to contact the ground 200.

Figure 4:
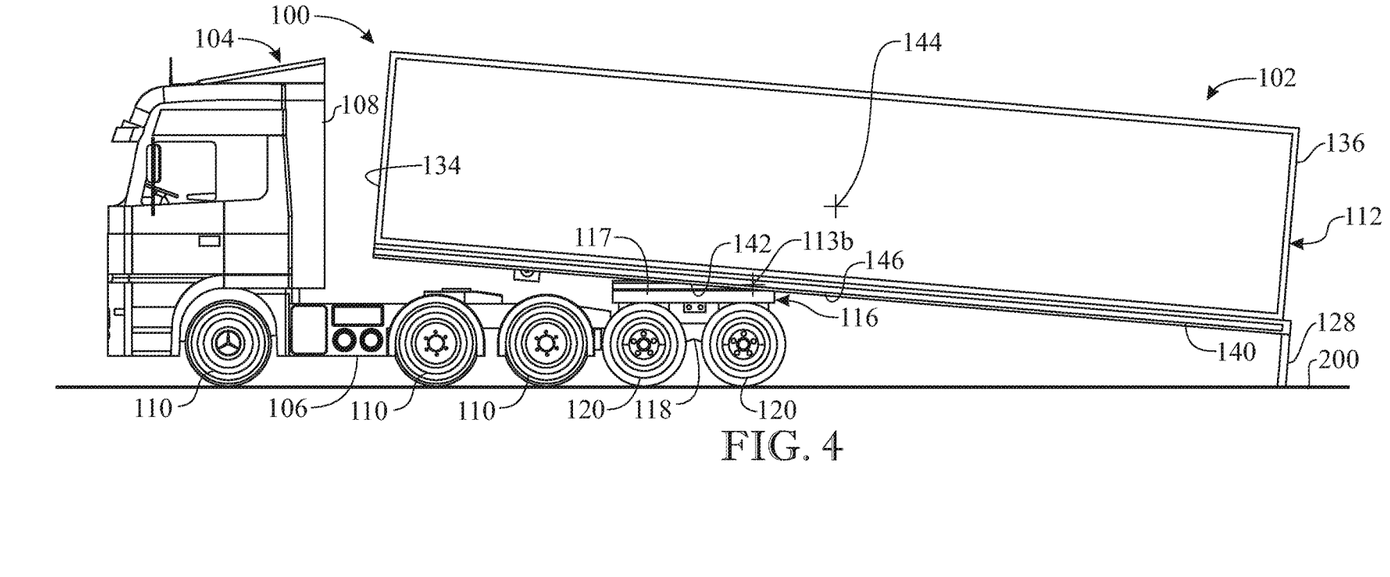
FIG. 4 presents a side elevation view of the vehicle trailer system of FIG. 1, with the rear wheel assembly at the loading/unloading position, the trailer having been deployed from the horizontal transport orientation to the sloped or angled loading/unloading orientation and the rear lift shown deployed in the stowed position.

The illustration of FIG. 4 shows the vehicle trailer system 100 in a position in which the rear lift 128 is contacting on the ground 200 and the rear wheel assembly 116 has reached the loading/unloading position 142. Upon positioning of the rear wheel assembly 116 at the front, loading/unloading position 142, the rear lift 128 is operated to complete deployment of the trailer 112 in the loading/unloading orientation. More specifically, the ramp actuating mechanism (not illustrated) is operated to deploy the rear lift 128 as shown in FIGS. 5 and 6, to reach a position in which the rear lift 128 is extended and substantially aligned with the floor 150 on the inside of the trailer 112, to facilitate loading/unloading of cargo into/from the trailer 112. Once the situation of FIG. 6 is achieved, cargo (not illustrated) may then be loaded or unloaded into or from the trailer 112 via the rear lift 128.

After loading/unloading of the cargo into/from the trailer 112 is completed, the pneumatic/hydraulic lift may be operated to return the trailer 112 from the angled or sloped loading/unloading orientation back to the horizontal transport orientation. The winch 124 of the wheel assembly adjustment mechanism 123 may again be operated to return the rear wheel assembly 116 from the front, loading/unloading position 142 back to the rear, transport position 140. The ramp actuating mechanism (not illustrated) may be operated to return the rear lift 128 from the extended position (FIG. 6) to the stowed position (FIG. 1). The semi-trailer truck 102 may then be driven to another destination for unloading/loading cargo.

The vehicle trailer system 100 can be retrofitted to an existing semi-trailer truck 102 or fabricated in place as the semi-trailer truck 102 is manufactured. The vehicle trailer system 100 renders the loading and unloading of trailers safe, expeditious and efficient. The vehicle trailer system 100 enables the rear trailer end 136 to be lowered to the ground, rendering ease in loading and unloading the trailer 112, particularly in areas of limited space. The vehicle trailer system 100 is cost-effective, and thus accessible to both large and small businesses. The various controls for operation of the vehicle trailer system 100, including the winch 124, the pneumatic/hydraulic lift (which pivots the trailer 112 between the angled or sloped loading/unloading orientation and the horizontal transport orientation), the rear lift 128, the locking system, and the main air brake, may be provided in the tractor unit 104 or in any other suitable accessible location.

Figure 9:
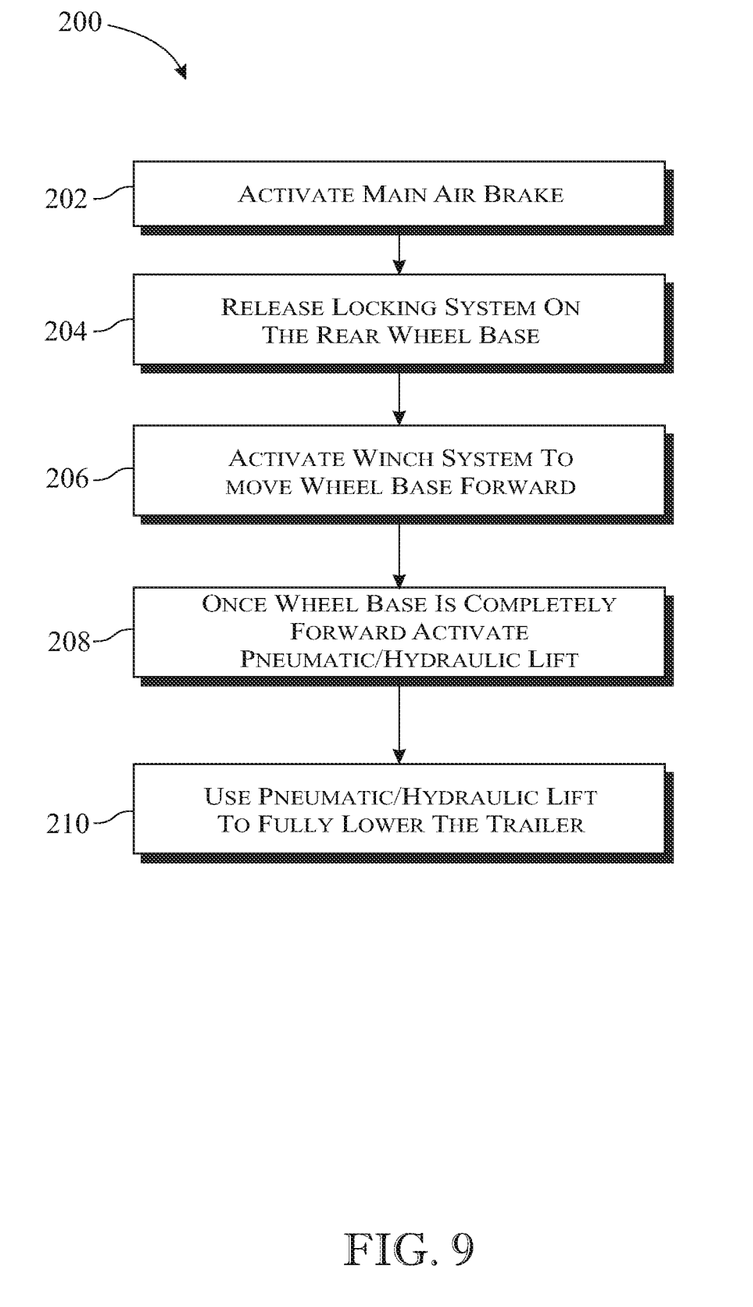
FIG. 9 presents a flow diagram of an exemplary method of loading and unloading cargo to and from a vehicle trailer in accordance with the invention.

Referring next to FIG. 9, a flow diagram 200 of a method of loading and unloading cargo onto and from a trailer on a vehicle, such as but not limited to a semi-trailer truck, is illustrated. The vehicle may include a tractor unit, an elongated trailer which is coupled to the tractor unit and a rear wheel assembly which is slidable relative to the trailer in a front-to-back, longitudinal direction, and pivotable relative to the trailer about a side-to-side, transverse rotation axis. The rear wheel assembly is selectively adjustable in position along the trailer between a rear transport position and a forward loading/unloading position typically across a center of gravity of the trailer. At step 202, a main air brake on the tractor unit may be activated to prevent inadvertent movement of the vehicle. At step 204, a locking system on a rear wheel base of the rear wheel assembly may be released. At step 206, a winch system or other wheel assembly adjustment mechanism may be activated to move the wheel base of the rear wheel assembly forward from the rear transport position, typically across the trailer center of gravity to the forward loading/unloading position on the trailer allowing the trailer to pivot rearward in relation to the rear wheel assembly. At step 208, a rear lift (which can be, for instance, pneumatically- or hydraulically-powered) may be deployed from a stowed position to an extended position, allowing the trailer to fully lower and cargo to be loaded or unloaded into or from the trailer via the rear lift. In subsequent steps, the trailer may be returned from the loading/unloading orientation to the transport orientation, the rear wheel assembly may be returned from the loading/unloading position back to the transport position and the rear lift may be returned from the extended position back to the stowed position for transport of the vehicle.

The illustrations of FIGS. 10-13 show a sequence of operation of a vehicle trailer system 300 in accordance with another embodiment of the invention. The embodiment of FIGS. 10-13 includes the elements of the embodiment of FIGS. 1-8 and further includes a collapsible support 360. The collapsible support 360 is attached to and carried by the trailer 112 rearward of the transport position 140 of the rear wheel assembly 116, such as, but not limited to, at or near the rear trailer end 136, for purposes that will be hereinafter described. The collapsible support 360 may include, for instance and without limitation, one or more foldable legs 362 comprising one or more rollers 364 configured to roll on the ground 200. As will be described in greater detail hereinafter, the foldable legs 362 are foldable and extendable relative to the trailer 112 and trailer frame 114. In different embodiments, the foldable legs 362 may be attached to varying sections of the trailer 112; for instance and without limitation, the foldable legs 362 may be secured to the bottom trailer wall 130, to the trailer frame 114, or to a portion of the track rails 122 which is arranged rearward of the transport position 140 of the rear wheel assembly 116.

In the sequence of FIGS. 10-13, a method of operating the vehicle trailer system 300 in order to load or unload the trailer is shown. In the depicted sequence, the trailer 112 of the vehicle trailer system 300 of the present embodiment is deployed from an initial, horizontal transport position illustrated in FIG. 10 to an angled or sloped loading/unloading position illustrated in FIG. 13 to facilitate loading of cargo (not illustrated) into the trailer 112 or unloading of cargo from the trailer 112.

Figure 10:
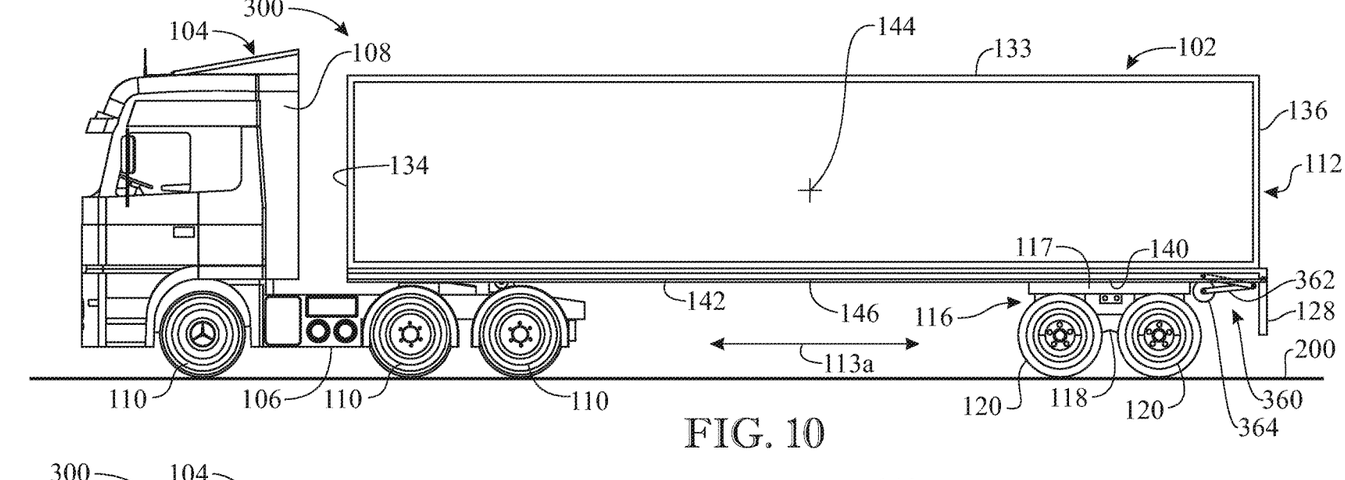
FIG. 10 presents a side elevation view of a vehicle trailer system in accordance with a second illustrative embodiment of the present invention, with the rear wheel assembly in a rear, transport position and the trailer deployed in a horizontal transport orientation.

In the initial position of FIG. 10, the trailer 112 is arranged generally horizontally and the rear wheel assembly 116 is located at the rear, transport position 140. In addition, the rear lift 128 is folded downward and is in the air, i.e. at a distance from the ground 200. The collapsible support 360, i.e. the one or more foldable legs 362, is arranged in a position in which the roller or rollers 364 do not contact the ground 200 and are instead in the air. For example, the collapsible support 360 may be folded upward and substantially against, adjacent or near the bottom of the trailer (e.g., at or near the bottom trailer wall 130), such as to increase aerodynamics and/or to minimize interference with other components. As shown, the center of gravity 144 of the trailer 112 or on the trajectory of the rear wheel assembly 116 is located such that the horizontal projection 146 of the center of gravity 144 is arranged between the rear, transport position 140 and the front, loading/unloading position 142 of the rear wheel assembly 116; i.e., the center of gravity 144 is located longitudinally between the transport position 140 and the loading/unloading position 142. Similarly to the previous embodiment, the exact longitudinal position of the center of gravity 144 (i.e. the position of the horizontal projection 146) and the vertical position of the center of gravity 144 may vary, for instance depending on whether the trailer 112 is unloaded or loaded. When loading the trailer 112, the load (not shown) can be positioned in such a way that the center of gravity 144 of the trailer 112 and load continues to be arranged so that its horizontal projection 146 is arranged between the transport position 140 and the loading/unloading position 142.

Starting from the initial position of FIG. 1, the main air brake (not illustrated) or other type of main brake on the tractor unit 104 of the semi-trailer truck 102 may be activated to immobilize the semi-trailer truck 102. Once the semi-trailer truck 102 is immobilized, the semi-trailer truck 102 may then be operated, for instance and without limitation, to accumulate air pressure for a pneumatic system powering the winch 124 (FIG. 7). The locking system (not illustrated) on the rear wheel assembly 116 may then be released to facilitate travel of the rear wheel assembly 116 along the track rails 122. Next, the winch 124 of the wheel assembly adjustment mechanism 123 may be operated to start advancing the rear wheel assembly 116 on the track rails 122 from the rear, transport position 140 forward, as indicated by arrow A in FIG. 11. Continued operation of the winch 124 causes the rear wheel assembly 116 to eventually reach the horizontal projection 146 of the center of gravity 144 of the trailer 112 as illustrated in FIG. 11.

Figure 11:
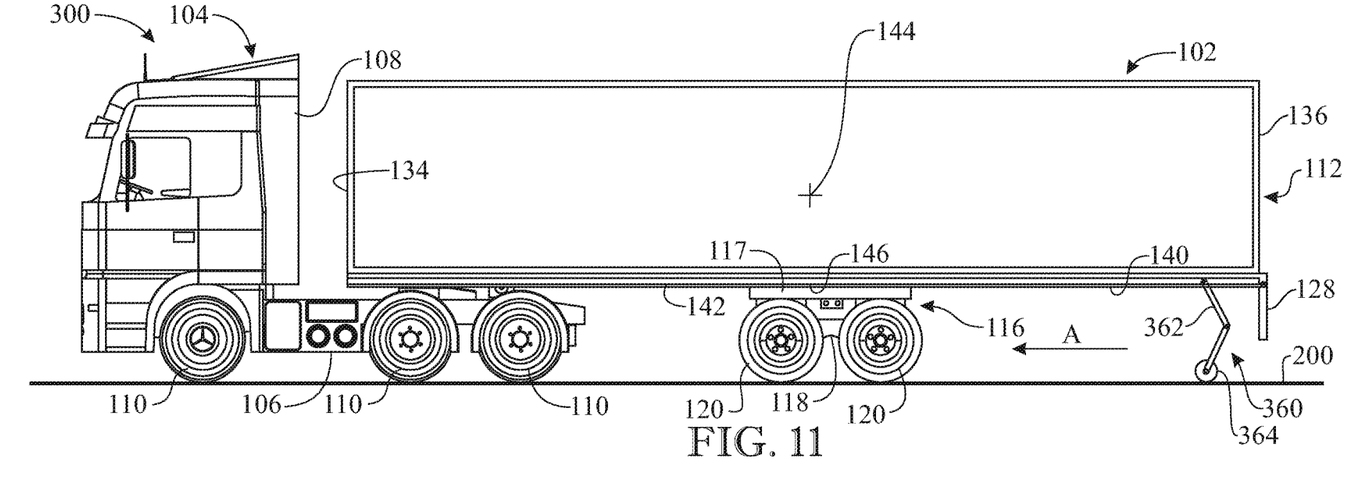
FIG. 11 presents a side elevation view of the vehicle trailer system of FIG. 10, with the rear wheel assembly at the trailer center of gravity as it transitions from the transport position to the loading/unloading position, and the trailer is supported by an extended, collapsible support which rests on the ground.

As further shown in FIGS. 10 and 11, the collapsible support 360 is deployed from the upward, folded position of FIG. 10 to a downward, unfolded or deployed position shown in FIG. 11, in which the collapsible support 360 rests on the ground 200. Deployment of the collapsible support 360 may be carried out prior to advancing the rear wheel assembly 116 from the transport position 140 to the horizontal projection 146 of the trailer center of gravity 144, simultaneously to advancing the rear wheel assembly 116 from the transport position 140 to the horizontal projection 146, and/or once the rear wheel assembly 116 has reached the horizontal projection 146.

The collapsible support 360 is configured to support part of the weight of the trailer when resting on the ground 200. For example, in some embodiments, the foldable leg or legs 362 of the collapsible support 360 may be formed with articulated connections having a sufficient and predetermined friction to allow the collapsible support 360 to remain in a downward, deployed position, supporting the trailer weight in part, until a threshold downward force is applied onto the collapsible support 360 by the trailer that causes the collapsible support 360 to fold or collapse. In other embodiments, the collapsible support 360 may include one or more dampeners configured to offer resistance to collapsing of the collapsible support 360; for instance and without limitation, the dampener or dampeners may include a mechanical dampener (e.g., a spring), a hydraulic dampener, a gas cylinder or dampener, or a pneumatic dampener. In some embodiments, the hydraulic, gas or pneumatic dampeners may be configured to allow the collapsible support 360 to collapse when a threshold and predetermined downward force is applied onto the collapsible support 360 by the trailer. In other embodiments, the dampener may be operated by an external system or user-operable control (e.g., a cable) to activate the flow of hydraulic fluid, gas or air within the dampener when actuated by the external system or user-operable control.

From the situation of FIG. 11 (in which the collapsible support 360 is deployed and resting on the ground, and the rear wheel assembly 116 has reached the horizontal projection 146), continued operation of the winch 124 causes the rear wheel assembly 116 to overcome the horizontal projection 146 of the center of gravity 144, and the trailer 112 to thus tend to pivot downward (i.e., clockwise) while the rear wheel assembly 116 continues moving forward. As the rear wheel assembly 116 continues to advance forward, the trailer will exert an increasing downward force on the collapsible support 360, which in turn is resting on the ground 200. As described hereinabove, the collapsible support 360 will eventually start to fold. For example, in some embodiments described above, the increasing downward force will eventually become sufficiently high to overcome a frictional, hydraulic, pneumatic or other resistance to folding of the collapsible support 360; in other embodiments, the collapsible support 360 will need to be previously enabled to collapse, such as by external or user operation of the collapsible support 360. As the collapsible support 360 starts to fold, the trailer 112 is allowed to pivot downward, with the collapsible support 360 supporting and stabilizing the trailer 112 as the rear wheel assembly 116 continues to advance forward and the collapsible support 360 collapses as the trailer 112 pivots downward, as shown in the progression from FIG. 11 to FIG. 12.

Figure 12:
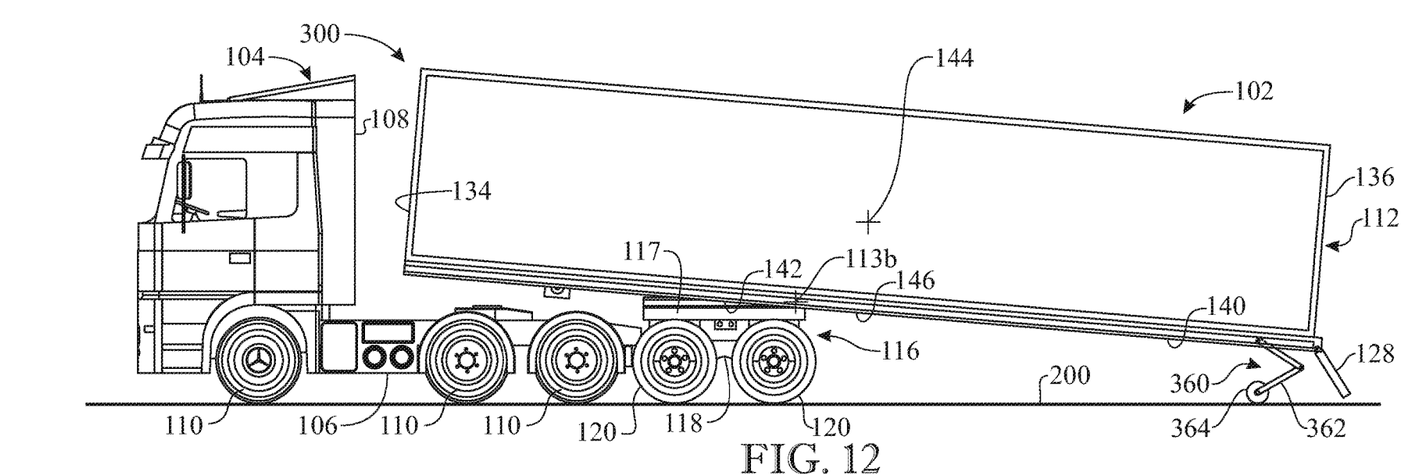
FIG. 12 presents a side elevation view of the vehicle trailer system of FIG. 10, with the rear wheel assembly at the loading/unloading position, the trailer shown being deployed from the horizontal transport orientation towards a sloped or angled loading/unloading orientation while the trailer is supported by the collapsible support, as the support collapses.

Eventually, the rear wheel assembly 116 reaches the frontward, loading/unloading position 142 shown in FIG. 12. In this situation, the collapsible support 360 may be partially or fully collapsed, and continues to rest on the ground 200. For instance, in the depicted example, the collapsible support 360 is partially collapsed when the rear wheel assembly 116 has reached the loading/unloading position 142. The collapsible support 360 may continue to controlledly collapse (i.e. to collapse supporting the trailer weight and dampening downward pivoting of the trailer) until reaching a fully collapsed position shown in FIG. 13. In turn, as shown in FIGS. 12 and 13, the rear lift 128 is pivoted upward from the downward position of FIGS. 10 and 11 towards a raised position (FIG. 13) configured to facilitate loading/unloading of the trailer 112 as described with reference to the embodiment of FIGS. 1-8.

Figure 13:
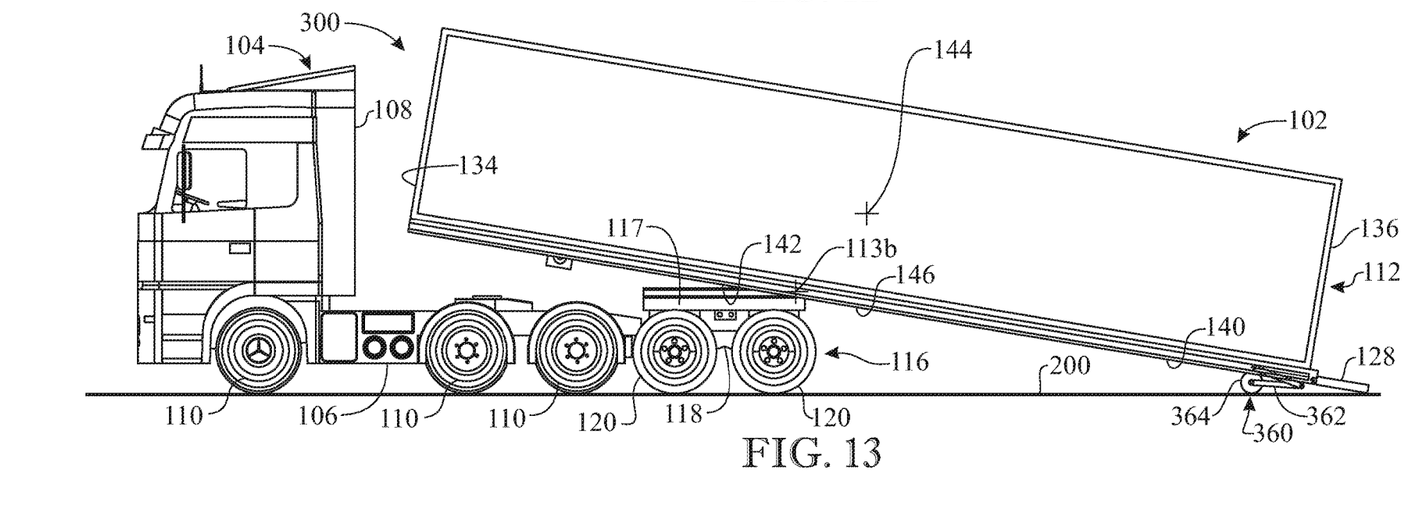
FIG. 13 presents a side elevation view of the vehicle trailer system of FIG. 10, with the rear wheel assembly at the loading/unloading position, the trailer deployed in the sloped or angled loading/unloading orientation, the collapsible support collapsed, and the rear lift deployed in the extended position for loading and unloading of cargo to and from the trailer.

The illustration of FIG. 13 shows the vehicle trailer system 100 in a position in which the rear wheel assembly 116 is arranged in the loading/unloading position 142, the trailer 112 is pivoted rearward, and the rear lift 128 and collapsible support 360 rest on the ground 200. The collapsible support 360 supports much of the weight of the trailer 112, stabilizing the trailer 112, and optionally allows for rolling mobility or maneuverability (via roller or rollers 364). In turn, the rear lift 128 facilitates loading/unloading the trailer 112 via the rear lift 128, and optionally supports part of the weight of the trailer 112. Once the situation of FIG. 13 is achieved, cargo (not illustrated) may then be loaded or unloaded into or from the trailer 112 via the rear lift 128.

After loading/unloading of the cargo into/from the trailer 112 is completed, the pneumatic/hydraulic lift may be operated to return the trailer 112 from the angled or sloped loading/unloading orientation back to the horizontal transport orientation. The winch 124 of the wheel assembly adjustment mechanism 123 may again be operated to return the rear wheel assembly 116 from the front, loading/unloading position 142 back to the rear, transport position 140. The ramp actuating mechanism (not illustrated) may be operated to return the rear lift 128 from the extended position (FIG. 6) to the stowed position (FIG. 1). The collapsible support 360 may return from the collapsed position (FIG. 13) to the extended position (FIG. 11) to stabilize the trailer 112 as the trailer 112 is raised, and then once more collapsed (FIG. 10) to the transport position of FIG. 10. The semi-trailer truck 102 may then be driven to another destination for unloading/loading cargo.

It will be appreciated by those skilled in the art that the vehicle trailer system 100 including the one or more collapsible supports 360 can be retrofitted to an existing semi-trailer truck 102 or fabricated in place as the semi-trailer truck 102 is manufactured.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A vehicle trailer system for raising and lowering a trailer to expedite loading and unloading of cargo into and from the trailer, the vehicle trailer system comprising:
   at least one track rail configured to mount to a trailer in a front-to-back, longitudinal direction along the trailer;
   a rear wheel assembly comprising a bracket, a frame, at least one wheel, and a locking brake, wherein the bracket is configured for adjustment in position along the at least one track rail for front-to-back, longitudinal displacement of the rear wheel assembly along the at least one track rail, wherein the frame is pivotably mounted on the bracket, wherein the at least one wheel is rotatably carried by the frame, and further wherein the locking brake is operable to selectively prevent or allow rotation of the at least one wheel independently of a main air brake of a tractor unit attached to the trailer; and
   a collapsible support mountable to the trailer rearward of the at least one wheel in the first position of the rear wheel assembly, the collapsible support comprising at least one roller configured to rest on and roll on the ground surface; wherein
   the trailer system is configured to selectively and reversibly adopt:
      a transport configuration, in which the rear wheel assembly is longitudinally adjusted to a first position along the at least one track rail while the main air brake of the tractor unit is engaged and the locking brake of the rear wheel assembly is disengaged, the first position located rearward of a center of gravity of the trailer, and further in which the trailer is pivoted frontward relative to the rear wheel assembly and is arranged in a horizontal transport orientation, and
      a loading and unloading configuration, in which the rear wheel assembly is longitudinally adjusted to a second position along the at least one track rail while the main air brake of the tractor unit is engaged and the locking brake of the rear wheel assembly is disengaged while the at least one wheel of the rear wheel assembly are on a ground surface, the second position located frontward of the center of gravity of the trailer, and further in which the trailer is pivoted rearward relative to the rear wheel assembly and is arranged in a rearward sloped orientation; wherein
   the collapsible support is configured to rest on the ground surface and dampen downward pivoting of the trailer as the trailer system switches from the transport configuration to the loading and unloading configuration.

2. The vehicle trailer system of claim 1, wherein the collapsible support is deployable to an extended configuration in which the collapsible support rests on the ground surface and supports at least part of a weight of the trailer as the rear wheel assembly longitudinally surpasses the center of gravity and until the rear wheel assembly longitudinally displaces to the second position.

3. The vehicle trailer system of claim 1, wherein, in the transport configuration of the rear wheel assembly, the collapsible support is collapsed and does not contact the ground surface.

4. The vehicle trailer system of claim 1, wherein, in the loading and unloading configuration of the rear wheel assembly, the collapsible support is collapsed and rests on the ground surface to support part of a weight of the trailer.

5. The vehicle trailer system of claim 1, further comprising a rear lift pivotably mountable to the rear end of the trailer and operable to selectively align with a floor of the trailer for loading and unloading of cargo to and from the trailer.

6. The vehicle trailer system of claim 5, wherein, in the loading and unloading configuration of the trailer system, the rear lift is aligned with the floor of the trailer.

7. The vehicle trailer system of claim 6, wherein, in the loading and unloading configuration of the trailer system, the rear lift touches the ground surface.

8. The vehicle trailer system of claim 1, wherein the at least one wheel of the rear wheel assembly comprises at least one pair of tandem rear wheels rotatably carried by the frame.

9. The vehicle trailer system of claim 1, wherein the at least one track rail is configured to mount to a bottom wall of the trailer.

10. The vehicle trailer system of claim 1, wherein, in the transport configuration, the at least one wheel of the rear wheel assembly is on a ground surface and provides rolling mobility to the trailer.

11. The vehicle trailer system of claim 1, further comprising a wheel assembly adjustment mechanism operably engageable with the rear wheel assembly to facilitate selective positioning of the rear wheel assembly relative to the at least one track rail.

12. The vehicle trailer system of claim 11, wherein the wheel assembly adjustment mechanism comprises a winch.

13. The vehicle trailer system of claim 12, wherein the winch is mountable to a bottom wall of the trailer.

14. The vehicle trailer system of claim 12, further comprising at least one winch cable engageable with the rear wheel assembly and the winch, wherein the at least one winch cable is operable by the winch to displace the rear wheel assembly along the at least one track rail.

15. The vehicle trailer system of claim 14, wherein the at least one winch cable is engageable with the frame of the rear wheel assembly.

16. A method of loading and unloading cargo to and from a vehicle trailer, comprising the steps of:
   obtaining a vehicle trailer and a tractor unit attached to the trailer;
   obtaining a vehicle trailer system, the vehicle trailer system comprising at least one track rail mounted to the trailer in a front-to-back, longitudinal direction along the trailer, a rear wheel assembly comprising a bracket, a frame, at least one wheel, and a locking brake, wherein the bracket is configured for adjustment in position along the at least one track rail for front-to-back, longitudinal displacement of the rear wheel assembly along the at least one track rail, wherein the frame is pivotably mounted on the bracket, wherein the at least one wheel is rotatably carried by the frame, and further wherein the locking brake is operable to selectively prevent or allow rotation of the at least one wheel independently of a main air brake of the tractor unit;
   providing a collapsible support, the collapsible support comprising at least one roller;
   mounting the collapsible support to the trailer rearward of the at least one wheel in the first position of the rear wheel assembly;
   extending the collapsible support such that the at least one roller rests on the ground surface;
   adjusting the longitudinal position of the rear wheel assembly from
      a transport configuration, in which the rear wheel assembly is longitudinally adjusted to a first position along the at least one track rail while the main air brake of the tractor unit is engaged and the locking brake of the rear wheel assembly is disengaged, the first position located rearward of a center of gravity of the trailer, and further in which the trailer is pivoted frontward relative to the rear wheel assembly and is arranged in a horizontal transport orientation, to a loading and unloading configuration, in which the rear wheel assembly is longitudinally adjusted to a second position along the at least one track rail while the main air brake of the tractor unit is engaged and the locking brake of the rear wheel assembly is disengaged while the at least one wheel of the rear wheel assembly are on a ground surface, the second position located frontward of the center of gravity of the trailer, and further in which the trailer is pivoted rearward relative to the rear wheel assembly and is arranged in a rearward sloped orientation; and supporting the trailer on the collapsible support as the trailer pivots downward as the rear wheel assembly is adjusted from the transport configuration to the loading and unloading configuration.

\* \* \* \* \*